Figure 1:
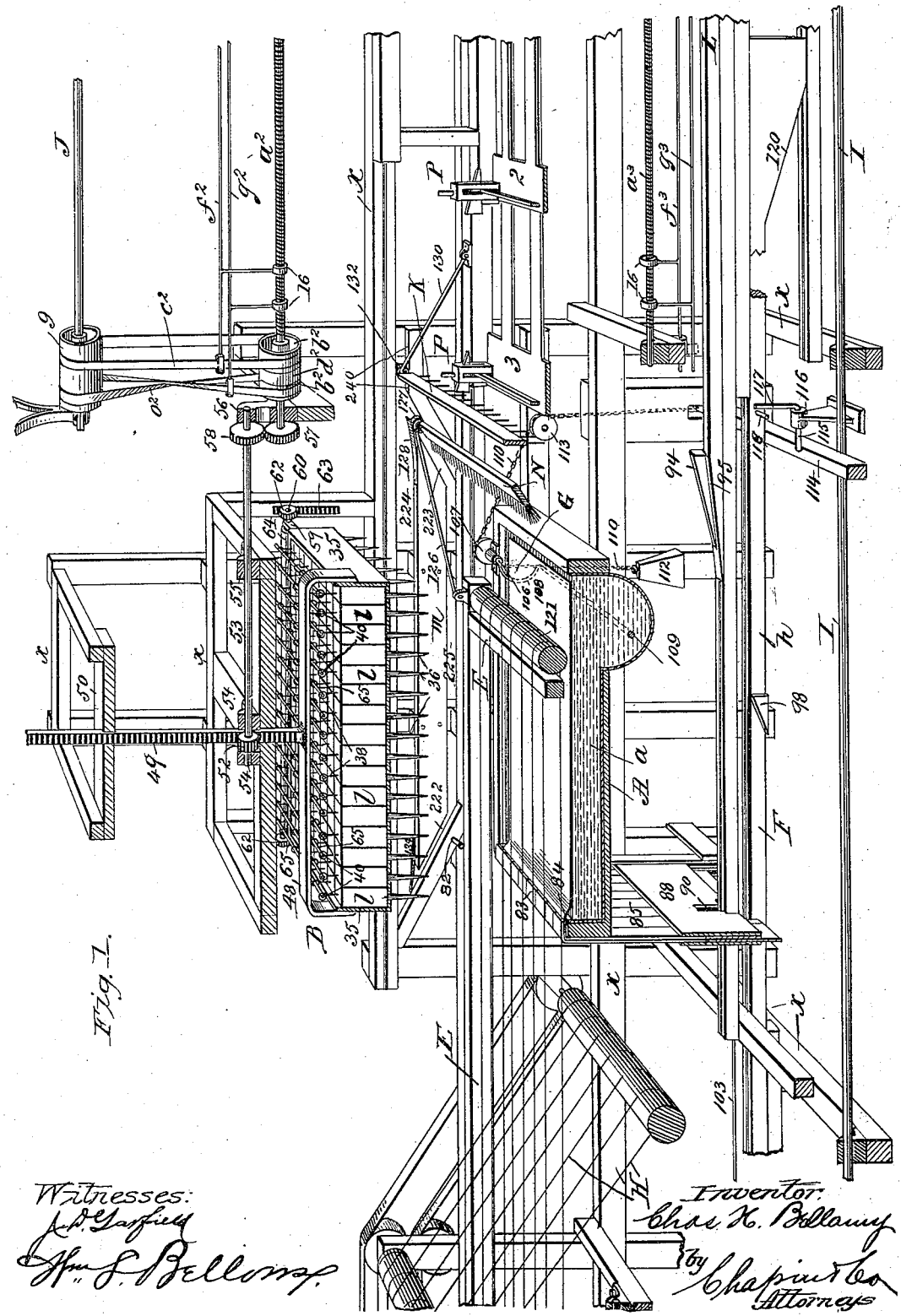

(No Model.) 11 Sheets—Sheet 1.

C. H. BELLAMY.
MACHINE FOR MARBLEIZING PAPER.

No. 438,739. Patented Oct. 21, 1890.

Witnesses:
Inventor:
Chas. H. Bellamy
by Chapin & Co.
Attorneys (No Model.)

11 Sheets—Sheet 2.

C. H. BELLAMY.
MACHINE FOR MARBLEIZING PAPER.

No. 438,739. Patented Oct. 21, 1890.

Fig. 2.

Witnesses:
J. P. Garfield
W. J. Bellamy

Inventor,
Chas. H. Bellamy
by Chapin & Co.
Attorneys (No Model.)

11 Sheets—Sheet 3.

C. H. BELLAMY.
MACHINE FOR MARBLEIZING PAPER.

No. 438,739.

Patented Oct. 21, 1890.

Fig. 3.

Witnesses:
J. W. Garfield,
W. F. Bellamy

Inventor:
Chas. H. Bellamy
by Chapin & Co.
Attorneys (No Model.) 11 Sheets—Sheet 4.
C. H. BELLAMY.
MACHINE FOR MARBLEIZING PAPER.
No. 438,739. Patented Oct. 21, 1890.
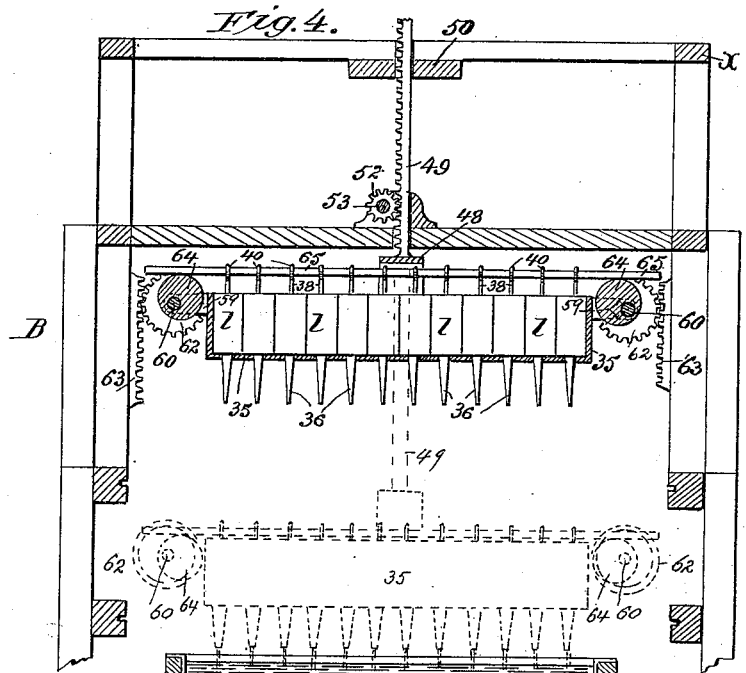
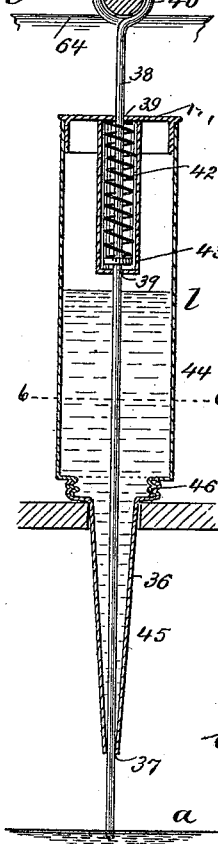
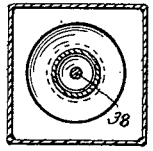
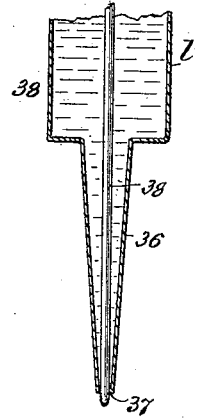
Witnesses:
J. D. Garfield
Wm. F. Bellows
Inventor
Chas. H. Bellamy
by Chapin & Co.
Attorneys (No Model.) 11 Sheets—Sheet 5.
C. H. BELLAMY.
MACHINE FOR MARBLEIZING PAPER.
No. 438,739. Patented Oct. 21, 1890.
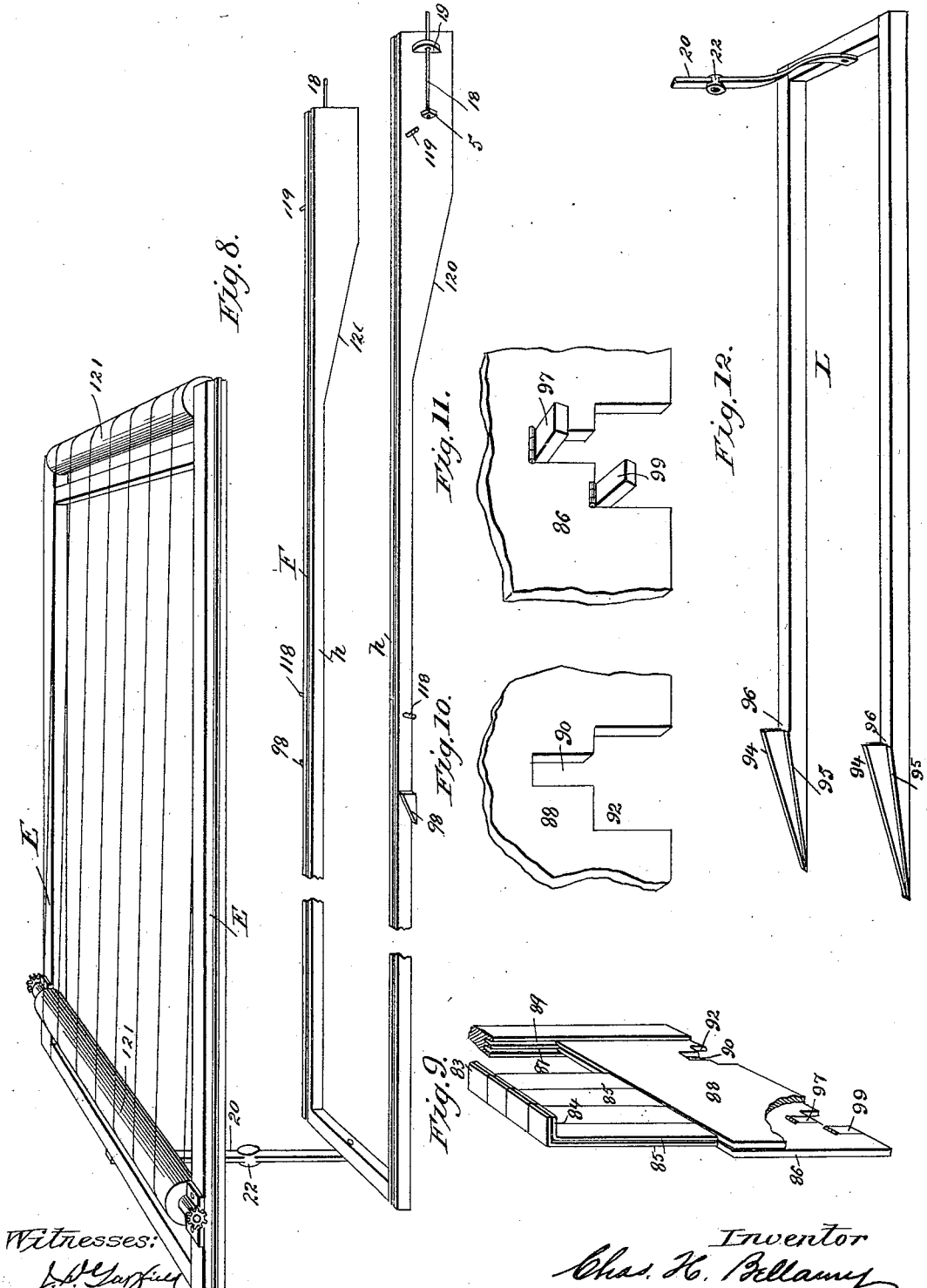
Witnesses:
Inventor
Chas. H. Bellamy
by Chapin & Co
Attorneys (No Model.) 11 Sheets—Sheet 6.

C. H. BELLAMY.
MACHINE FOR MARBLEIZING PAPER.

No. 438,739. Patented Oct. 21, 1890.

Witnesses:
J. H. Garfield
Wm. L. Bellamy

Inventor
Chas. H. Bellamy
by Chapin & Co
Attorneys

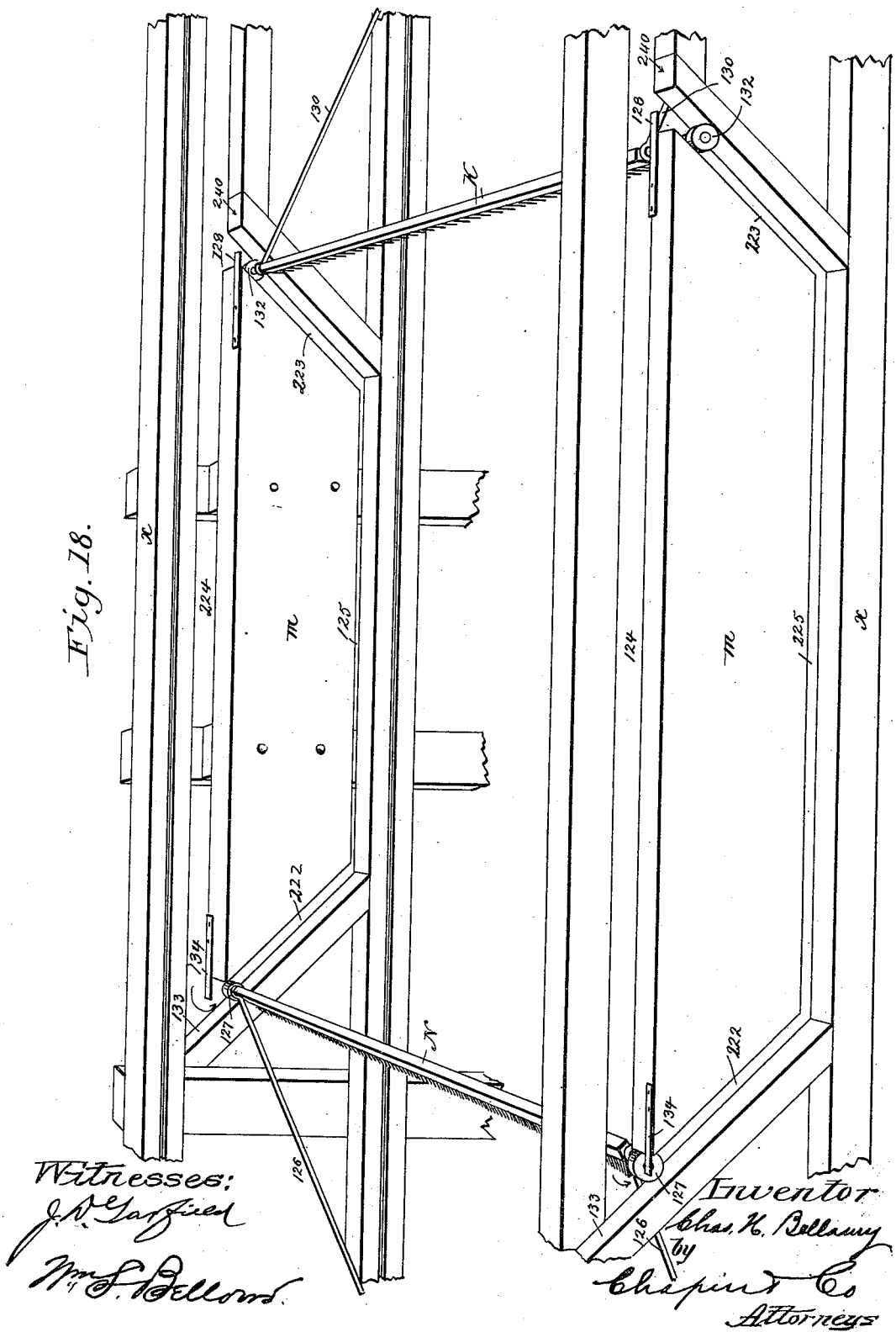

(No Model.) 11 Sheets—Sheet 8.
C. H. BELLAMY.
MACHINE FOR MARBLEIZING PAPER.

No. 438,739. Patented Oct. 21, 1890.

Fig. 21.

Witnesses:
J. W. Gayfield
Wm. F. Bellows

Inventor:
Chas. H. Bellamy
by
Chapin & Co.
Attorneys.

(No Model.) 11 Sheets—Sheet 9.
C. H. BELLAMY.
MACHINE FOR MARBLEIZING PAPER.

No. 438,739. Patented Oct. 21, 1890.

(No Model.)   11 Sheets—Sheet 10.

C. H. BELLAMY.
MACHINE FOR MARBLEIZING PAPER.

No. 438,739.   Patented Oct. 21, 1890.

(No Model.)  
11 Sheets—Sheet 11.

C. H. BELLAMY.
MACHINE FOR MARBLEIZING PAPER.

No. 438,739.  Patented Oct. 21, 1890.

Fig. 24.

Fig. 25.

Witnesses:
J. D. Garfield
Wm. T. Bellamy

Inventor.
Chas. H. Bellamy
by Chapin & Co.
Attorneys.

THE NORRIS PETERS CO., PHOTO-LITHO., WASHINGTON, D. C.

UNITED STATES PATENT OFFICE.

CHARLES H. BELLAMY, OF SOUTH HADLEY FALLS, MASSACHUSETTS.

MACHINE FOR MARBLEIZING PAPER.

SPECIFICATION forming part of Letters Patent No. 438,739, dated October 21, 1890.

Application filed November 6, 1889. Serial No. 329,441. (No model.)

*To all whom it may concern:*

Be it known that I, CHARLES H. BELLAMY, a subject of the Queen of Great Britain, residing at South Hadley Falls, in the county of Hampden and State of Massachusetts, have invented new and useful Improvements in Machines for Marbleizing Paper, of which the following is a specification.

This invention relates to machines for marbleizing paper—that is, imparting to paper a variegated, mottled, or marble-like appearance. Such class of paper, as well known, occupies a prominent place in the trade for constituting unique and ornamental fly-leaves and coverings for books, linings and coverings for some kinds of boxes or cabinets, and for filling multifarious other requirements.

Heretofore, so far as known to me, the making of marble-paper has been substantially by hand with the aid of a vat containing a solution of gum, on the top of which colors are deposited, the paper then being carefully and evenly laid on the top of the vat and immediately withdrawn therefrom, carrying therewith the colors in distribution and arrangement corresponding with that which they had on the top of the gum solution.

The object of this invention is to perform by automatic machinery all that has heretofore been done by hand, and, furthermore, consequent upon the capabilities of the machine, as will hereinafter appear, some effects may be with great certainty derived, which effects it is not possible to attain in hand manufacture, notably that the more or less irregular disposition of the color on one sheet may be made to correspond with that of the preceding and subsequent sheets which are produced in the machine; and the invention consists in the combination of instrumentalities and in the construction and combination of parts to constitute certain of the instrumentalities, all as will hereinafter more fully appear, and be set forth in the claims.

Reference is to be had to the accompanying drawings, forming part of this invention, in which similar characters of reference indicate corresponding parts in all the views.

Figure 14:
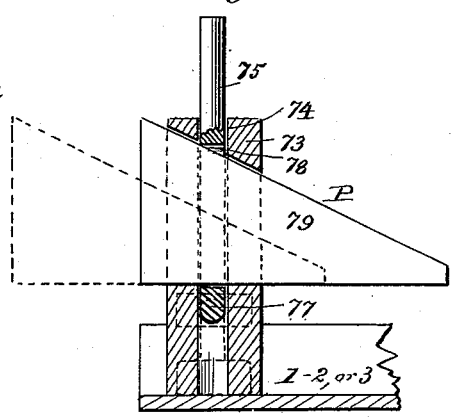
Figure 15:
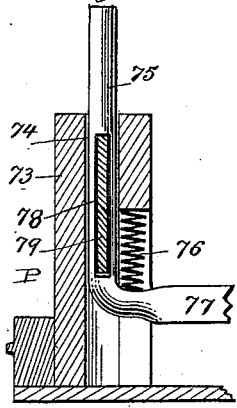
Figure 16:
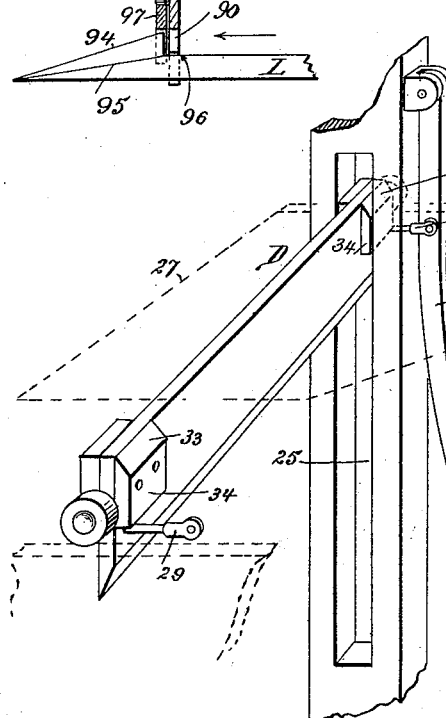
Figure 22:
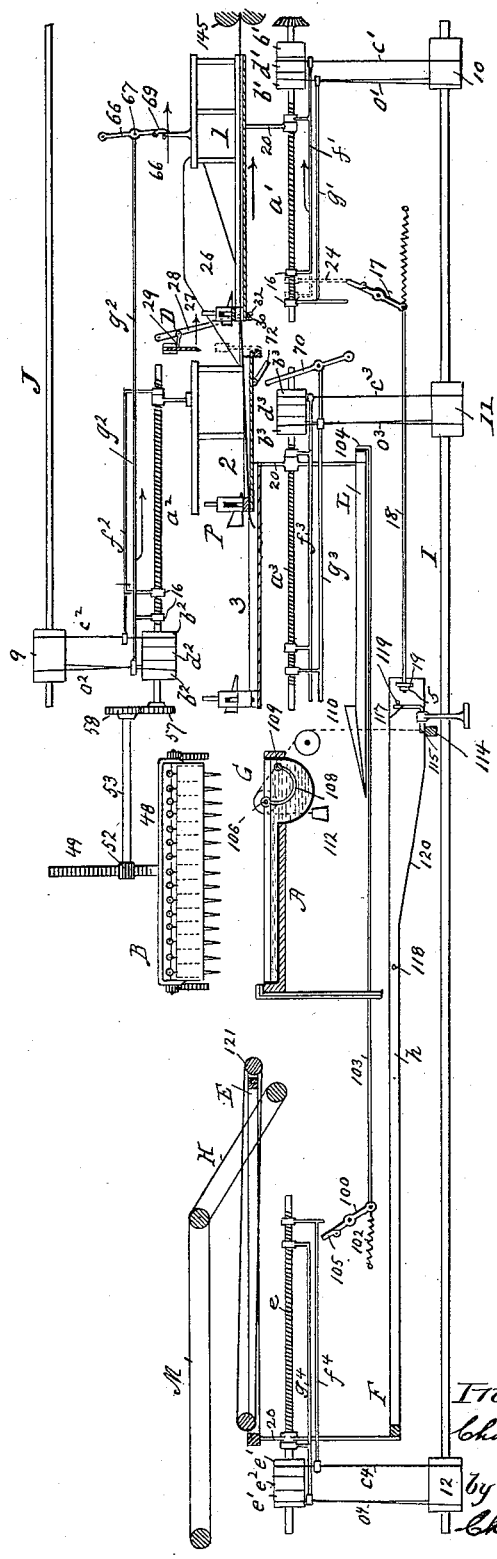
Figure 23:
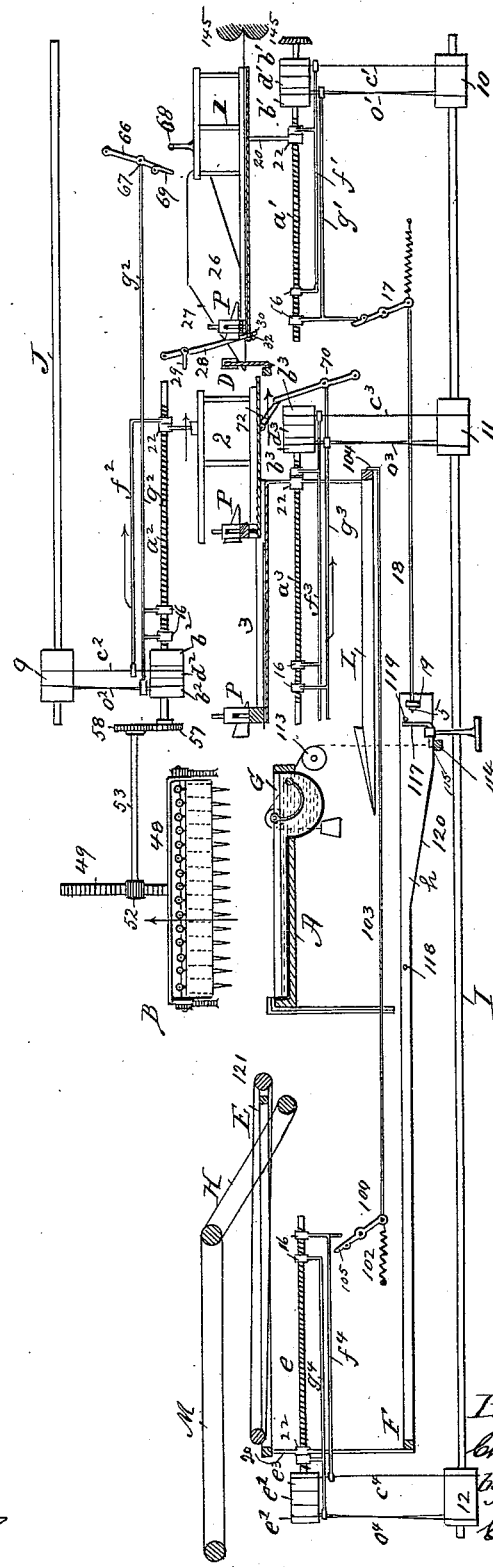

Figures 1, 2, and 3 are views of portions of the machine in perspective as seen back of the longitudinal median plane thereof, Fig. 1 showing the intermediate portion of the machine, Fig. 2 the portion of the machine at the rear thereof, and Fig. 3 represents the portion of the machine forward of the said intermediate portion. Many of the parts which are shown in said portions of the machine here given are duplicated in the portions of the machine which are forward of said central longitudinal plane, as will be obvious from an inspection of the drawings and from the description hereinafter given. Fig. 4 is a vertical sectional view transversely of the machine through the apparatus for automatically distributing the color, which is also shown in Fig. 1. Fig. 5 is a central vertical sectional view of one of the individual color-boxes, a plurality of which is comprised in the said color-distributing apparatus. Fig. 6 is a horizontal sectional view of said color-box on the line 6 6, Fig. 5. Fig. 7 is a sectional view of part of the color-box, similar to Fig. 5, but showing a movable part, which is combined therewith in a changed position. Fig. 8 is a perspective view of an endless-cord-carrying frame, to be hereinafter referred to, and also of a sub-frame, which is affixed thereto and movable therewith. Figs. 9, 10, 11, 12, and 13 are perspective and sectional views of parts constituting and also working in conjunction with certain devices for confining the paper at the forward end of the vat, as will hereinafter fully appear. Figs. 14 and 15 are sectional views taken in planes at right angles to each other of a form of paper-confining device for use on the carriages. Fig. 16 is a perspective view of mechanism acting in conjunction with the paper-severing knife, to be hereinafter described. Fig. 17 is a view of a form of device to which reference will be made hereinafter in describing the movements of the carriages or frames. Fig. 18 is a perspective view, the utility of which will be apparent on a consideration of the movements of "brushing" and "combing" devices, which are embodied in the machine. Fig. 19 is a view of a clutch-pulley employed in connection with means for drawing the paper to be marbleized off from the supply-roll in the quantities required. Fig. 20 is a perspective view of a part of what is hereinafter termed the device for "capsizing" a rear portion of the paper after the same has been disposed on the vat and lifting and placing such portion on the appliance for withdrawing the sheet from the vat. Fig. 21 is a view in the nature of a diagram, the disposition of all the principal parts being such as if seen in central longitudinal vertical section and showing their relations just as one complete operation of the machine is being finished and just before another operation of the machine is about to be commenced. Figs. 22, 23, and 24 are similar views to the one Fig. 20, showing some of the parts in their altered positions as they assume during different stages of the operation of the machine; and Fig. 25 is a vertical sectional view of parts to illustrate their relative positions during another stage in the operation of the machine, to be hereinafter referred to.

In the particular form of machine shown in the accompanying drawings as embodying my invention are comprised intermediately of the machine a vat A for holding a quantity, sufficient to nearly or quite fill it, of gum solution $a$ for receiving the color thereon. Above the said vat is a color holding and distributing apparatus B, adapted to express therefrom the colors upon the top of the gum solution in the vat at the proper time. To the rear of the said vat is located the paper-supply, here shown as comprised in the roll C, in advance of which are carriages 1, 2, and 3. The paper is drawn off from the roll and by its extremity carried to and slightly beyond the forward end of the carriage 1, said paper being, near its forward end, gripped by devices on the forward extremity of said carriage 1. The said carriage 1 moves forward over carriage 2, carrying the paper forward by its forward end to the forward end of carriage 2, when the grip on the paper, by the gripping device on the forward end of carriage 1, is released, and the said paper is gripped by devices therefor on the forward end of carriage 2. Carriage 1 then retraces, moving off from over carriage 2. A cutting-off mechanism (shown at D) a little in advance of carriage 1 and to the rear of carriage 2 then operates to sever the portion of the paper which is on carriage 2 from that which is at the rear thereof. The size of the sheet of paper severed from the main roll is to be preferably of the same width or a little less than that of the vat and about as long as the length of said vat. Carriage 2 then moves forward over carriage 3, and on the arrival of its forward end at the forward end of carriage 3 the end portion of the sheet is released from the gripping devices on carriage 2 and gripped a little back from its forward extremity by gripping devices on the forward end of carriage 3. Carriage 2 then retraces to its normal position. Carriage 3 then moves forward over the vat, the color having ere this been deposited on the top of the gum solution, and on the arrival by its forward end over the forward end of the vat the paper is released from the grip thereon of the devices of said carriage 3 and then gripped at its forward end by gripping devices located at the forward end of the vat. Carriage 3 then retraces from over the vat to its normal position. A carriage or frame E, located forward of the vat and comprising endless carrier cords or tapes, then moves rearwardly over the vat, its rear end moving nearly to the rear end of the vat. This position of said frame is seen in Fig. 1. A capsizing device (indicated at G) lifts and overturns the rear end portion of the paper from the gum-liquid and disposes it upon the rear end portion of said carrier-frame. As the frame E then returns to its normal position, moving forwardly, the endless cords thereof are then caused to also move forwardly independently of and in addition to the movement of the frame and draw the paper off, and, without any dragging action thereof on the surface of the gum solution, at the same time overturning the sheet, so that the side of the sheet which has received the color is uppermost. As the sheet is fed forward on and by the endless cords of the carrier-frame, it is taken by and upon another series of endless carrier-cords H, having their plane of travel at an angle to and obliquely crossing the plane of travel of the cords of said carrier device, and the paper is conveyed away from the machine, the carrier itself being of sufficient length to serve as a drying-machine, or it may be arranged to convey the marbled sheets to a contrivance having proper capabilities for drying them.

In order to impart to the marble paper certain streaked, striped, grainy, or wavy features, as is commonly seen in this kind of paper after the color has been deposited on the liquid in the vat, a device (substantially a comb) is raked through the liquid, causing such a modification in the arrangement of the color distributed on the top of the liquid as to produce the appearance desired, and a combing device K may be provided and supported on a proper movable part of the machine, which may operate at the proper time to accomplish the result stated.

Having now briefly described the machine in a general way, in order that its nature and capabilities may be better understood, I will now proceed to describe more minutely and in detail the various mechanisms which I have embodied in my machine.

In the machine I provide a main shaft I and a counter-shaft J, the latter deriving its continuous rotation from connections between it and the main shaft. The main shaft is ranged below the operative parts of the machine, while the counter-shaft is above the said parts, both being supported in suitable bearings of the frame $x$, which may be of any approved form of construction for supporting the instrumentalities constituting the machine and for serving as guideways for certain of them that are movable. If desired, however, the counter-shaft may be supported from hangers secured to the flooring above.

For the carriages 1, 2, and 3 are provided feed-screw shafts $a'$, $a^2$, and $a^3$, and there is for the carrier-frame E a feed-screw shaft $e$, each screw-shaft being mounted in suitable bearings in the frame for rotation, the feed-screw shafts $a'$ and $a^3$ and the one $e$ being located longitudinally below the carriages or frame which they respectively drive, while the feed-screw shaft $a^2$ is above the carriage 2. Each of the carriages and the frame 1, 2, 3, and E has a fixed arm or projection 20, extended to engage, by the nut 22 thereon, with the screw-shaft respectively provided therefor.

Each feed-screw shaft $a'$, $a^2$, $a^3$, and $e$ is provided with two pairs of loose pulleys thereon, the same being respectively indicated by $b'$ $b'$, $b^2$ $b^2$, $b^3$ $b^3$, and $e'$ $e'$, and a fixed pulley intermediately of each pair of loose pulleys, (respectively indicated by $d'$, $d^2$, $d^3$, and $e^2$,) and above the set of pulleys $b^2$ $b^2$ and $d^2$ on the screw-shaft $a^2$ is a drum 9 on the counter-shaft J, and below the said sets of pulleys and on the main shaft are drums 10, 11, and 12, respectively.

Between and around each of the drums 9, 10, 11, and 12 and the sets of pulleys on the feed-screw shafts are open belts (indicated, respectively, by $c'$, $c^2$, $c^3$, and $c^4$,) and crossed belts (indicated, respectively, by $o'$, $o^2$, $o^3$, and $o^4$,) the open belts being respectively adapted to be shifted from one of the loose pulleys of the set for each screw-shaft onto the fixed intermediate pulley of the respective set, and each crossed belt is also adapted to be shifted from the other loose pulley of its set of pulleys onto the fixed pulley, and when the crossed belt is around the one fixed pulley the screw-shaft will be driven to feed forward, the open belt at such time being around a loose pulley, and when the crossed belt is moved off from the fixed pulley and the open belt is moved onto the fixed pulley the screw-shaft will be rotated to feed rearwardly. At times both open and crossed belts for a given screw-shaft may be around loose pulleys.

Belt-shifters to be automatically operated are provided, those indicated by $f'$, $f^2$, $f^3$, and $f^4$ being for the open belts, while the others (indicated by $g'$, $g^2$, $g^3$, and $g^4$) are for the crossed belts, and each comprises a rod having at one end belt-engaging hooks or yokes 15 or other equivalent devices, and also provided with rigid projections or dogs 16, some of which dogs loosely encircle the screw-shafts and are adapted to be engaged by moving parts to shift the belts, while others thereof are otherwise properly extended to be engaged and moved by movable parts, as will hereinafter more fully appear. For instance, now assuming that the frame E has been projected over the vat, as seen in Fig. 1, to take on a sheet of paper, and is moving forwardly to the limit of its forward movement, as seen in the diagram view, Fig. 21, and noting that the sub-frame F, comprising the long bars $h$, located lengthwise of and under most of the parts of the machine and guided for longitudinal movement, is rigidly joined to the said frame E, and observing that there is provided under the left-hand dog 16 of the belt-shifter $g'$ under carriage 1 an intermediately-pivoted upright lever 17, the upper arm of which is just at the left of said dog, and further noting that a rod 18 is connected to the lower end of said lever, said rod passing longitudinally forward loosely through an apertured ear-piece 19 on said bar $h$, and having at the end thereof, at the left of said ear-piece, an abutment or head 5, it will be plain that as the said frame E completes its movement forward, having but a short distance to go, the ear-piece on one of said bars $h$ will abut against the head of the rod 18, moving the rod forward, swinging the upright lever 17, its upper arm moving rearwardly, which upper arm, by its abutment with the said left dog of the said belt-shifter $g'$, moves the belt-shifter and the crossed belt for carriage 1 onto the fixed pulley $d'$ of screw-shaft $a'$, when the said screw-shaft will be rotated to feed carriage 1 forward, and the said dog then occupies the position indicated by the dotted lines at 24 in diagram view, Fig. 22.

The transverse cutting-off knife D has bearings for vertical movement in ways 25 of the machine-frame just a little in advance of the forward edge of carriage 1 when said carriage is in its rearmost position. (See Fig. 2 and diagram view, Fig. 21.) The knife is by each end projected outwardly beyond its bearings, and there are on each side of carriage 1 plates or cheek-pieces 26, having upwardly and rearwardly inclined forward edges 27, which in their forward movements with the carriage force the knife, which had previously fallen, upwardly. A supporting device for the knife at each end is provided, which, as shown, consists of a swinging lever 28, pivoted by its upper end on each side upright of the frame, said bar having a little way below its pivotal point a horizontal longitudinally-extended supporting-arm 29, and having on its lower end a horizontal laterally-extended abutment-stud 30.

The carriage 1 having moved forward and carried the paper thereon forward to the forward edge of the next carriage, at the same time drawing paper off from the roll to an extent corresponding to the distance of travel of the carriage, (and raising the knife, the same being held supported by the arm 29,) the gripping device at the forward end of carriage 1 at such time releases its hold on the paper and the gripping device on the forward end of carriage 2 then is operated to hold the paper. As carriage 1 reaches its forward limit, its screw-shaft-engaging nut 22 abuts against the left-hand dog of the belt-shifter $f'$ for the open belt $c'$, driven from drum 10, moving the belt-shifter and the open belt onto the fixed pulley $d'$, and, as the left-hand dog 16 for belt-shifter $g'$ is at this time lying against and to the left of said left-hand dog of said belt-shifter $f'$, said belt-shifter $g'$ is moved forwardly, carrying the crossed belt off from the fixed pulley $d'$, and of course, as the open belt is on the fixed pulley, the feed screw-shaft $a'$ will be driven to move the carriage rearwardly to its normal position. There is on the rear end of carriage 1 and at either side thereof a downwardly-extending pin 32, (one side pin being shown in perspective in Fig. 2,) which is projected across the horizontal plane of the stud 30 on the swinging lever carrying the knife-supporting arm 29. As the carriage 1 approaches its rearmost position, the said downwardly-extending pins 32, abutting against the horizontal studs 30, swing the levers 28 rearwardly, and just as the carriage 1 reaches its rearmost position the supports for the knife have been entirely removed and the knife is permitted to drop to sever the paper which has been carried forward to and upon carriage 2 from that which is behind the rear edge of said carriage. The pins 32 of carriage 1 always remain forward of the studs 30 on the swinging lever, and as carriage 1 again moves forward the said pins moving therewith are so removed from engagement with the said studs 30 that the swinging lever may hang normally in a position to support the knife in its elevated position.

It will be here explained that the projections 34 of the knife at each side, extending beyond the guide and bearing ways 25 therefor, are formed as shown at 33 in Fig. 16, with their upper portions inclined, so that as they pass upwardly against the said arms 29 they will force the arms and the lever carrying them rearwardly until the knife projections have passed above the said arms, when from gravity the swinging bar will be swung into its normal position, the arms 29 moving into the position of support for and under the said knife projections.

The color-distributing mechanism or apparatus B operates in conjunction with the forward movement of carriage 2, and a description of the said color-distributing apparatus will be now given and will be stated as comprising a suitable chest 35, adapted to have intermittent vertical reciprocating movements and supported in said chest, a series of color holders or boxes 1, provided with extensions 36, projecting through and below perforations in the bottom of the chest. The substantial construction of the individual color-boxes may be seen in Figs. 5, 6, and 7. The lower end of each color-holding box, which is projected through the bottom of the chest, is formed like a nozzle with an aperture 37 in its lower end. There is a rod or finger 38 of small diameter, having axial-bearings 39 in the upper portion of the color-box, and said rod is projected downwardly to the lower tapered end of the box and adapted to play loosely through the aperture thereat, said rod having its end, which is extended somewhat above the top of the box, formed into a ring-eye 40. A spiral spring 42 is applied between the inner side of the top wall of the box and a shoulder 43, located on the rod 38 below such top for normally insuring the disposition of the rod, so that its end portion will remain at or within the lower tapered end portion of the color-box, which normal position is particularly seen in the sectional view, Fig. 7.

The color-box is, as shown in Fig. 5, formed by upper and lower sections 44 45, united by the screw-threaded extremities, as seen at 46, the one being adapted for removal from the other for the introduction into the body proper of the box of the color, or the upper portion of the box (designated by 47) may be removed for the entrance into the box of the color.

The chest is supported over the vat A by means of a rigid strap 48 or other adequate form of frame, to which strap or frame is secured a rack-bar 49, vertically extended therefrom centrally above the chest 35 and having bearings for steady movement in the elevated portion 50 of the frame $x$. With said vertical rack-bar 49 engages a pinion 52, fixed on a horizontal shaft 53, having bearings, as at 54, 55, and 56, in suitable portions of the frame $x$, said shaft receiving its intermittent rotary reciprocating motion from the intermittent rotary reciprocating movements of the feed screw shaft $a^2$ through the medium of the intermeshing gears, one 57 on said screw-shaft $a^2$ and the other 58 on said horizontal shaft 53.

There are supported in bearings 59 on the forward and rear sides of the color-box chest 35 horizontal shafts 60 60, ranging longitudinally of the machine, each having at both its ends pinion-gears 62, meshing with short vertical rack-bars 63, respectively, provided therefor and supported on vertical posts of the frame $x$. Each of said shafts 60 60 between said bearings therefor has itself formed into or has attached thereto an eccentric roller 64—that is, the center of such roller is not coincident with its center of rotation. Instead of being in the form of an eccentric roller, said intermediate portion of the shaft may have some other cross-sectional contour to constitute itself a cam.

The series of color-boxes, as will be noted on an inspection of the drawings, Figs. 1 and 4, are ranged in regular rows filling the chest 35, with their rods 38 in alignment, the planes of the ring-eyes 40 thereof above the top of the boxes being substantially longitudinally of the machine, and a rod 65 is provided for each laterally-aligned series of color-boxes, which passes through the ring-eyes thereof, and by its ends rests upon said eccentric or cam shafts. Assuming the color-box chest to be in its uppermost position and the eccentric rollers turned so as to maintain the horizontal rods 65 in their highest plane, the said rods 38 of the individual color-boxes will be upwardly drawn and maintained, as seen in the said Figs. 4 and 7. Now, as the color-box chest 35 is, through the rotation of the horizontal shaft 53, moved downwardly through the engagement of the pinions 62 on the eccentric supporting-shafts with the vertical racks 63, the said eccentrics will be so turned as to permit of the depression of all of the transverse rods 65, and the said vertical rods 38 of all the color-boxes will be caused to be projected beyond the lower extremities thereof, carrying out from said color-boxes and in adhesion on their ends a quantity of color, which color, when the chest 35 is sufficiently depressed to permit the lower extremities of the rods to touch or enter the gum liquid of the vat A, will be deposited on the top of said gum liquid.

In Fig. 4 the uppermost disposition of the color-box chest is shown in full lines, the position of the cam or eccentric shafts and the rods for supporting the vertical color-box rods is also shown in full lines, and in said view in dotted lines is indicated the projection of the color-box chest downwardly into proximity to the vat, the relative position of the cam or eccentric shafts, the transverse rods 65, and color-box rods 38 being also indicated.

It will be noted that the vertical rack-bars 63 are of such a slight length as to be in mesh with the pinion but for a short portion of the period occupied by the descent of the chest, the length of such engagement being just sufficient to insure the turning of the eccentric-shaft to an extent to properly depress the horizontal transverse supporting-rods and secure the projection of the vertical color-box rods below the lower extremity of the boxes, for the purpose stated.

The rods 38 in the color-boxes may be omitted, and with them the mechanism for insuring the reciprocating motions of said rods, and by making the apertures in the lower extremities of the color-boxes smaller and imparting to the chest a slightly greater downward movement, so that the lower ends of the color-boxes may just enter below the surface of the liquid in the vat, on each of such depressions of the color-boxes a quantity of color may be given out from them with fairly satisfactory results.

I have devised other and distinctly different forms of mechanism for distributing the color on the surface of the color-supporting liquid, which may be substituted for the mechanism or apparatus illustrated and described.

The relations of the parts of the machine just before carriage 1 has reached its rearmost position are shown in the diagram Fig. 22. The belt-shifter $g^2$ for the crossed belt $o^2$ for driving forward the screw-shaft $a^2$ is projected rearwardly and connected by its extremity to an intermediate portion of a swinging lever 66, which by its upper end is pivotally hung on a transverse rod 67 (see Fig. 2) above the normal location of carriage 1, and said swinging bar below the point at which the belt-shifter is connected thereto is adapted to project across the horizontal plane of travel of a horizontal transverse stud 68, affixed above and at the side of said carriage 1, the said last-described parts being clearly shown in Fig. 2. Carriage 1, as it approaches its rearward limit in its return to its normal position by the said stud 68, comes in contact with the lower extremity of said swinging lever 66 and swings the same rearwardly, drawing the belt-shifter $g^2$ in the same direction, moving the belt onto the fixed pulley $d^2$, starting the feed-screw shaft $a^2$, and the length of said swinging bar 66 is such that just as the carriage 1 reaches its rearward limit said bar is swung upwardly, so that the stud 68 may pass by its extremity. As carriage 2 moves forward, caused so to do by the rotation of the feed-screw shaft $a^2$, the color-boxes, through the mechanism already described, are lowered to deposit the liquid color in proper distribution upon the surface of the liquid in the vat. When the carriage 2 has reached its forward limit and the gripping devices at the forward end thereof have released the paper, so that the same may be gripped by the devices on the forward end of carriage 3, the nut 22 on carriage 2 will abut against the forward dog on belt-shifter $f^2$, forcing the open belt $o^2$ onto the fixed pulley, and the dog on belt-shifter $g^2$, which at this time lies against and forward of the dog for belt-shifter $f^2$, is also moved forwardly, the crossed belt moving off of the fixed pulley as said open belt moves on, and carriage 2 thereupon retraces, moving back to its rearward limit, when the nut 22 on carriage 2, striking against the rearmost dog on belt-shifter $f^2$, moves the same to shift the belt and insure the stoppage of carriage 2. As in the completion of the forward movement of carriage 2 the dog on belt-shifter $f^2$ is by the nut 22 of carriage 2 forced against the dog on belt-shifter $g^2$, and said belt-shifter $g^2$ is moved forwardly, and the lever 66 is swung forwardly into its normal position. The lower end of the said lever 66 is formed by a pivoted pawl 69, the form of which is more clearly shown in Fig. 17, (this form of pawl-ended lever being employed in several other parts of the machine, as will hereinafter be manifest,) and force exerted against said pawl in one direction will cause the swing of the lever carrying the pawl, while force acting against the other side of said pawl and in the reverse direction will cause the pawl to swing on its pivot against its spring and without effect on its carrying-lever. Therefore as carriage 1 next again moves forwardly the horizontal stud 68 thereon, which is at the rear of said pawl-formed end of the lever 66, on its abutment against the rear of said pawl, swings the pawl forwardly and upwardly, permitting the said stud 68 to pass by. There is pivotally mounted by its end on the frame under carriage 2 a lever 70, adapted to swing in a vertical plane longitudinally of the machine, its upper end extending into proximity to the line of travel of a pawl 72, secured on the under side of carriage 2. To an intermediate portion of said lever 70 the rear end of belt-shifter $g^3$ is secured. As said carriage 2 approaches its rearmost limit, the belt-shifter $g^3$ is rearwardly drawn through the engagement of the pawl 72 with the swinging lever, whereby the latter is swung and the cross-belt for driving screw-shaft $a^3$ is moved onto the fixed pulley on said shaft, and carriage 3 is caused to move forward, carrying the paper thereon over the vat, and as its forward end comes near to the forward end of the vat its gripping devices release their hold on the paper, and the gripping devices at the forward end of the vat are at this time caused to open to permit the forwardly-projecting extremities of the sheet of paper on carriage 3 to enter between the jaws of said gripping device, which are then permitted to close. As carriage 3 reaches its forward limit of movement, the nut 22 thereon, which engages screw-shaft $a^3$, abuts against the dog 16 on the belt-shifter $f^3$ and moves it forward, causing the open belt to pass onto the pulley $d^3$, and the forward dog on belt-shifter $g^3$, which at this time is forward of and against the forward dog of the belt-shifter $f^3$, is also moved forwardly, insuring the drawing off of the crossed belt from the fixed pulley and onto its loose pulley.

The form of the device which is provided on the forward end of each of the carriages 1, 2, and 3 for gripping the paper is illustrated in Figs. 14 and 15 at P. At each side of each carriage and at the forward end thereof are provided suitable uprights 73, having vertical ways 74 therein, in which play vertical spindles 75, each spindle being held normally in its lowermost position by the spring 76, suitably applied. To the lower portions of each pair of spindles is secured a horizontal transverse gripper-bar 77, which extends across from one spindle to the other, passing through suitable apertures in the inner sides of the uprights 73. Each spindle 75 is provided with a vertical slot 78 therein, the general plane of which is longitudinally of the machine, and the uprights are also provided with vertical apertures or slots in longitudinal planes. A wedge 79, having the lower side of the triangle in a horizontal line, passes through the aperture in the upright and the slot in the spindle, the lower edge of the wedge bearing on the lower end of the aperture in the upright and the upper rearwardly and downwardly extending edge of the wedge bearing on the upper end of the slot 78 through the spindle. As any sufficient force is applied on the forward and larger ends of the pair of wedges, the same will be forced rearwardly, moving the spindles, and with them the gripper-bar 77, upwardly, and the gripper-bar will remain upwardly away from the bottom or platform of the carriage until force is applied on the rear ends of said wedges to move them forward, when, under the action of the springs, the spindles and the gripper-bar will move downwardly. The wedges of the gripping device on carriage 1 as such carriage moves rearwardly cause the bar 77 to grip the paper by the rear ends of the wedges striking against abutment studs or lugs 80, affixed on the sides of the frame $x$ in a transverse line nearly coincident with but a little forward, however, of the rearward limit of travel of the points of said wedges. The wedges of carriage 1 on striking by their forward ends against those on carriage 2 secure the release of the gripping device for carriage 1 and the closing of the gripper on carriage 2. The gripper on carriage 2 is next released by its wedges striking against those on carriage 3, closing the gripper for carriage 3, and the gripper on carriage 3 is released by force being imparted on the forward end of its wedges in any suitable manner, as by said wedges while moving forward striking against studs or lugs 82 on the side of the frame in a transverse line near the limit of the forward movement of said wedges on carriage 3.

I have devised other forms of automatic gripping devices for confining the sheets on the carriages, and which at my pleasure I may substitute for ones such as shown and described; but the latter-mentioned devices have been found practical and efficient.

The gripping devices provided at the forward end of vat A and the actuating devices therefor are illustrated in perspective and sectional views in Figs. 9, 10, 11, 12, and 13, which gripping and actuating devices will be now described. These gripping devices comprise upper and lower jaws 83 and 84, respectively, one adapted to rest upon the other, and the lower one to normally rest upon the horizontal top forward edge of the vat A. The upper and lower horizontal jaws are formed upon or attached to the upper ends of vertical uprights 85, the one for the upper jaw lying against and forward of the upright for the lower jaw, as shown in detail in Figs. 9 and 13, and these jaws, as shown, are formed in sections, as are also their supporting-uprights, for a more continuous and uniform bearing on the paper; but this provision I do not deem absolutely essential. Each of the uprights for the sectional portions of the upper jaw 83 is supported on a transverse board or plate 86, guided for vertical movement in side grooves 87 of the frame $x$ and suitably supported in its normal lowermost position, and a similar transverse supporting board or plate 88 is also provided for the uprights of the sectional members of the lower jaw 84, being similarly guided in vertical grooves or ways 89 at the sides of the frame. The rear one 88 of these cross-boards for supporting the uprights of the lower jaw-sections is provided within its lower edge with recesses 90 and 92. Attached to and below carriage 3 is a sub-frame L, adapted to move with said carriage 3, the same being supported on the sub-frame F, which is attached to frame E, said sub-frame L being guided in suitable horizontal ways of the said frame F for a movement independent of the movements of said latter frame, and on the forward portions of said frame L are two pairs of inclines 94 and 95, the slopes of which tend rearwardly and upwardly, the inclines of each pair standing in offset planes, and one incline 94 of each pair thereof is steeper and attains a greater height than does the other. As said frame travels forward with carriage 3, the said inclines bear upon the under sides of said transverse supporting-boards, raising them, and with them the jaw-supporting uprights respectively supported thereon.

It will be seen that the steepest inclines 94, for elevating the upper jaw, pass through the recesses 90 in the rearmost transverse board 88 without effect on such board to raise it, but impinge against the forward cross-board 86, serving to raise the same higher than does the other set of inclines 95 raise the said rearmost board. Thus while the under jaw or series of jaws is raised to a certain extent by the inclines 95, so that the top thereof is about level with the paper on carriage 3, the upper jaw or sectional series thereof is raised somewhat higher than the top of carriage 3, so that the paper may be readily entered between said jaws. As carriage 3 finishes its forward travel, the inclines 94 and 95 have just passed by their rear ends, which are perpendicular, beyond the forward face of the foremost supporting cross-board 86, said cross-board dropping to the level of the top of the side bars of the frame L, which level is coincident with the highest point on the set of inclines 95, and therefore, while the rear supporting-board is held elevated in a certain degree by the portions 96 of the frame at the rear of the inclines 95, the forward supporting-board drops to the level of said portion of the frame, resting thereon, and the upper jaws fall upon the paper, clamping the same against the under jaws. As the frame L moves rearwardly with carriage 3, the inclines 95 for the rear cross-board are withdrawn from under the same, permitting said board to fall to its normal position and the lower jaws to come to a bearing on the forward top edge of the vat, the upper jaws following the lower jaw to its lowermost limit.

Figure 13:
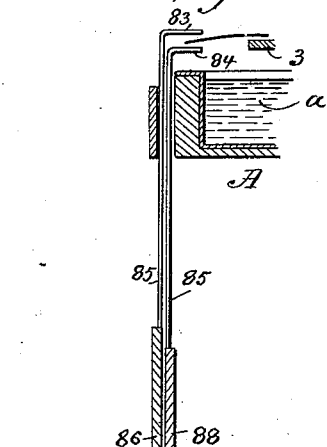

It will be noticed in the perspective views, Figs. 9 and 11, and the sectional view, Fig. 13, that the lower edge portion of the forward cross-board, which is borne upon by the inclines 94 94, is comprised in hinged portions of the board or trap-doors 97, adapted to have a rearward swing to permit the inclines 94 to pass rearwardly past them as they move rearwardly with carriage 3, but to receive and withstand the impingement on the forward movement of said inclines to raise the board 86 and the upper jaw. This provision of devices for moving both jaws upwardly, one farther than the other, is deemed desirable, although not absolutely necessary, for in lieu thereof the lower jaw might be fixed and only the upper one moved; but for the most effectual and accurate confinement of the paper at the forward end of the vat two sets of movable jaws are to be preferred.

In order that, as carriage 1 grips the forward extremity of the paper from the roll and moves forward therewith, there may be no excessive draft on the paper, means for drawing the paper off from the supply-roll C in successive quantities corresponding to the lengths of the forward travel of carriage 1 are provided, which comprise, first, the nipper-rolls 145 145, one above the other, just in advance of the supply-roll C, one of which on its one end, outside of its journal-bearing, is provided with a clutch-pulley $p$; secondly, the horizontal transverse shaft $q$, having thereon a bevel gear-wheel 146, which meshes with a bevel gear-wheel 147, which is on the rear end of the feed-screw shaft $a'$, and also having on its other end, which is at the same side of the machine as the said clutch-pulley $p$, a pulley 148, and, thirdly, a belt 149 between the said pulley 148 and the said clutch-pulley $p$. The clutch-pulley may be set loose on the gudgeon of the nipper-roll and provided on its face with a pawl 150, there being fixed on the gudgeon of the nipper-roll a ratchet-wheel 152, with which the pawl 150 may engage as the said pulley $p$, through the connections with the feed-screw shaft described, is rotated forwardly. As the feed-screw shaft rotates reversely, insuring the corresponding rotation of the pulley, the pawl thereof passes over the teeth on the ratchet without any effect to turn the ratchet or the nipper-roller on which the ratchet is carried. There are inclines 98, sloping rearwardly and upwardly, formed on the sides of the said sub-frame F, which moves with frame E, said inclines being in offset vertical planes from either the sets of inclines 94 or 95. After carriage 3 has moved forward and permitted its paper to be released therefrom and gripped by the jaws 83 84 described, and has then retraced and frame E has moved rearwardly over the vat, receiving thereon the paper, and is moving forward therewith to carry it out of the machine, the said inclines 98 on the sub-frame F pass unobstructedly through the recesses 92, formed in the rear jaw-supporting board 88, and impinge against the lower edge portion of the forward and upper jaw-supporting board, raising same and moving the upper jaw 83 away from and above the lower jaw 84, at the proper time releasing the paper, that it may be carried out of the machine.

In order that in the rearward travel of the sub-frame F with frame E the inclines may pass by the forward board 86 without effect thereon, as well as through the recesses 92 in the rearward board, the lower edge portions of said forward board in the planes of travel of said inclines 98 are formed by trap-doors 99, resisting the impingement of the said inclines 98 in a forward direction, insuring the raising of the upper jaws, but permitting said inclines to be carried through and by the said doors without affecting the jaws as the subframe F moves rearwardly. A pawl-ended lever 100, such as is shown in said Fig. 17, is pivotally mounted intermediate of its length on a suitable supporting part of the frame *x*, adapted to swing in a vertical plane longitudinally of the machine, and there is a spring 102 applied for action on said lever to maintain same normally in the vertical position shown in Fig. 24. To the lower end of said lever 100 is connected one end of a rod 103, rearwardly and horizontally projected beyond the rear end of the sub-frame L under the carriage 3, having at its rear end an upwardly-extending lug 104. As carriage 3 moves forward, say, from the position seen in Fig. 23, the said sub-frame moving therewith passes out of engagement with or bearing upon the lug 104 of said rod 103, and the lever 100, which at such time is in the oblique position shown in Figs. 3 and other views, is under the action of its spring carried into the upright position indicated in Fig. 24, the pawl 105 on the extremity of said lever passing by the downward extension of the dog on belt-shifter $f^4$ for the open belt $c^4$ of screw-shaft *e*. Carriage 3, having gone forward and returned to its normal rearward position, as it finishes its rearward travel, abuts by the rear end of the sub-frame L against the said rod-lug 104, moving said rod rearwardly, swinging the lever 100, so that the pawl-carrying end thereof swings forwardly, and with it moves the belt-shifter $f^4$ and the open belt $c^4$ onto the fixed pulley $e^2$ of the said screw-shaft *e*, the said pawl by its end swinging forwardly past the dog 16 of said belt-shifter, and the frame E will now be moved rearwardly, so that the rearward roll of the carrier-cords will be over the vat about in the position shown in Fig. 1, and as said frame E moves rearwardly, parts on the sub-frame F moving with said frame E, it insures the operation of the mechanism for raising the rear end of the sheet of paper which may be on the vat, at the same time overturning the end portion of the sheet and placing it upon the rear end of the carrier-frame, and said mechanism, which is illustrated in Fig. 1 and the several diagrams used, will now be described.

106 represents one of an axially-aligned pair of journal-studs having transverse bearings in the side walls of the vat near the rear end thereof. The extremities of said journal-studs 106 project laterally at each side beyond said side walls, receiving thereon fixed sheaves 107. Said transverse journal-studs inside of their bearings are extended in semi-circular or bow-shaped portions 108, occupying longitudinal planes having their ends farthest from their bearing portions joined by a transverse rod 109, crossing the vat horizontally. The normal position of this transverse rod is under the surface of the gum-liquid, as are also the bow-shaped sections 108, supporting said rod. A chain or cord 110 passes over each of the said sheaves 107 and downwardly forward thereof, supporting weights 112, and said chain or cord rearwardly of each sheave is passed over a guiding-sheave 113, located at each side of the frame, thence passing downwardly, and is attached to the end of a horizontal transverse bar 114. At each side of the machine near said transverse horizontal bar 114 is a sliding latch-rod 115, guided for horizontal movement through a suitable bearing and support 116, said latch-rod also having an upwardly-extended lug 117.

118 and 119 represent pins or dogs affixed horizontally upon the bars *h* of the sub-frame F, the distance between said dogs being a little less than the length of travel of said frame F. It will be noted that each of the said longitudinal bars *h* of the sub-frame F has intermediately of said dogs 118 119 its under edge 120 inclined, sloping downwardly and rearwardly. Just as said frame E and the sub-frame F reach their rearmost limit of travel the incline 120 of each of said bars *h* has passed rearwardly beyond the said transverse bar 114, and the foremost dog 118 of each of said bars *h* strikes against the lug 119 on the latch-rod 115, and said latch-rod is forced rearwardly out of engagement with the said bar 114, and under the action of the weight the said cord or chain connections will move, raising said bar and partially revolving the said capsizing device, it moving into the position indicated in dotted lines in Fig. 21. As frame E reaches the limit of its rearward travel, the nut 22, which engages screw-shaft *e*, strikes against the rearmost dog on the belt-shifter $g^4$, which at this time lies forward of and against the dog on belt-shifter $f^4$, and, moving both of said dogs, the open belt is moved off from the fixed pulley $e^2$ and the crossed belt is moved onto said fixed pulley, causing the retracing or forward movement of the frame E, which frame as it reaches its normal position forward abuts against the forward dog of the belt-shifter $f^4$, forcing the crossed belt $o^4$ off from its fixed pulley, when the frame E will come to rest.

As will be seen in Fig. 3, the forward endless cord-supporting roll 121 on the frame E has on its extremities fixed pinion-gears 122, and on the portions of the forward top rails 123 of the frame *x*, over which the said pinion-carrying ends of the roll E move in the forward half of its travel, are rack-bars 124. As the frame E moves rearwardly during the latter half or part of its travel, the roll 121 will be backwardly rotated, and through it the endless cords will have a reversed movement. As at this time there is no paper on the cords of the carrier-frame, this reversed movement of said frame affects nothing; but after the rearward extremity of the paper has been lifted off from the gum-liquid and overturned and deposited on the rear end of the carrier-frame, as the said frame then moves forward, the carrier-cords also have an independent forward feed movement for accelerating the drawing off of the paper from the liquid.

Fig. 25 is a diagram or cross-sectional view of the carrier-frame and the relation of the sheet thereto and to the surface of the liquid in the vat, the paper being shown as about half drawn off from the said surface, and indicating such withdrawn portion upon the carrier-frame as moving forwardly, the same, as it were, "crawling" up on the said carrier-frame as fast at least as the forward bodily movement of the frame causes the paper to be "peeled" off from the surface of the liquid. When the paper has, traveling on the endless cords, reached the obliquely-disposed set of carrier-cords H, it moves upon and along said cords out of the machine, said oblique set of carrier-cords having in rearward horizontal continuation thereof a series of endless carrier-cords M, which may be of sufficient length to constitute a drier. As the frame E moves forwardly, the inclines 120 on the bars $h$ act upon and against the top of the cross-bar 114, depressing same, and through the connections between said bar and the capsizing device the latter is caused to resume its normal position. When the longitudinal bars $h$ have moved about to their forward extent and the transverse bar has been depressed to its lowest limit, the pins or dogs 119 near the rearward ends of the bars strike against the lugs 117 of the latch-rods, moving the latter over the transverse bar and confining same in place until again removed by the other and forward set of pins 118 on the longitudinal bars $h$ in the next forward movement of the frame E.

A brushing contrivance for securing the even laying and contacting of the under side of the paper on the color-bearing surface of the gum-liquid, that it may take up all of said color, and which has not heretofore been mentioned, will be now described in conjunction with Figs. 1 and 18. It will be observed that the frame at each side of and above the top of the vat is provided with cheek-boards $m$, in which are formed opposing grooves, those 222 of the forward pair inclining forwardly and upwardly, while the grooves 223 of the rearward pair incline rearwardly and upwardly. The forward and rearward sets of oblique grooves open into and connect with the upper and lower horizontal ways 224 and 225. To the rear end of frame E at each side is pivotally connected a rod 126, the pair of such rods extending rearwardly and supporting a horizontal transverse brush N of a length sufficient to extend across the vat. Friction-rollers 127 are affixed on the ends of the head of said brush, which are adapted to extend across but a portion of the width of the parts of frame $x$, comprising the said cheek-pieces $m$. After the paper has been placed on the vat and as the frame E moves rearward the rollers 127 on said brush-head move along down the forward oblique slots 122, and on reaching the lower horizontal way 125 the brush is depressed, so that the lower flexible portion thereof will rest upon the paper with a delicate and yielding pressure, and as the frame E continues rearwardly the said brush will move over the whole surface of the paper from front to rear. As the brush reaches the rear end of the paper, the rollers on the ends thereof move up the oblique slots 223, passing and forcing themselves past spring-fingers 128, secured on the cheek-piece boards $m$ or other part of the frame to lie over said oblique slots 123. As the frame E may, perhaps, move slightly farther rearwardly, the rollers will run along on the longitudinal parts or rails 240 of the frame. As the frame E then moves out forwardly, the rollers 127 are prevented by the said spring-fingers 128 from moving down the oblique slots 223, but move along through the upper horizontal ways 224.

The device for the "combing" of the liquid and the color thereon, hereinbefore mentioned, is also illustrated in said Figs. 1 and 18. On the sides of carriage 3 are pivoted the ends of rods 130, which extend forwardly, carrying at their extremities intermediately thereof the comb K, the width of which is about equal to that of the vat. The end portions of the head of the comb are extended outwardly, receiving thereon friction-rollers 132, which are in planes outside of the friction-rollers on the brush-head, said friction-rollers being adapted to move in the ways formed by the said oblique slots 122 and 123 and the uniting upper and lower horizontal ways 224 and 225. As the carriage 3 moves forwardly with the paper, as has already been fully described, it carries the comb in advance thereof. The normal position of the comb device is shown in said Fig. 1. As the carriage 3 moves forward, the rollers 132 move down through the rear oblique slots 223 and then along the horizontal ways, the teeth of the combs at such latter period being depressed to enter the gum-liquid and to move forwardly through same, modifying the arrangement of the color thereon, as will easily be understood. As the carriage 3 completes its forward movement, the rollers on the comb move upwardly through the forward oblique slots 222, carrying the comb upwardly out of the liquid, and after said rollers have reached the level of the top edge of said cheek-boards $m$, if the carriage has then any further forward movement, the rollers will run upwardly on the lower forward side walls 133 of said forward oblique slots. Spring-fingers 134 are applied to overlie a portion of the width of said forward oblique slots in the plane of the top of said cheek-boards, and as the carriage 3 next moves rearwardly the rollers of the comb will not be permitted to travel down the forward oblique slots 222, but will be by the said spring-fingers switched into the upper horizontal ways 224. By an examination of the perspective view, Fig. 18, it will be seen that the rollers for the brush and the switching spring-fingers therefor are disposed in planes within the planes occupied by the rollers for the comb and the switching spring-fingers therefor, so that the brush may easily and positively have or be made to have the movements described without any effect thereon by the movements of the parts forming or effecting the comb devices.

What I claim as my invention is—

1. In a machine for marbleizing paper, a stationary vat for containing a color-supporting liquid and a series of color-receptacles supported above said vat, each color-receptacle having a delivery-orifice over the vat, the parts being combined and operating substantially as described.

2. In a machine for marbleizing paper, the combination, with a stationary vat for containing a color-supporting liquid, of a support above said vat and means for imparting thereto vertical reciprocating motions, a series of color-holding receptacles on said support having openings in their lower extremities, rods passing vertically through said color-holding receptacles and adapted to be projected through and beyond the said openings, and means for imparting to said rods vertical reciprocating movements, whereby they may be projected to or below the surface of said liquid when the above-named support is moved into its lowermost plane, for the purpose set forth.

3. In a machine for marbleizing paper, the combination, with a vat for containing a color-supporting liquid, of a support above said vat and means for imparting thereto vertical reciprocating motions, a series of color-holding boxes having the apertured lower extremities and provided with the vertical rods, horizontal shafts supported in bearings on the said reciprocatory support, each comprising cams intermediately of its length, a series of rods supported by their ends on said cams and intermediately engaging the upper ends of said color-box rods, a pinion on each of said cam-carrying shafts, and a stationary horizontal rack-bar with which each of said pinions engages, substantially as described.

4. A color-holding box for the purpose set forth, consisting of a main body portion having a downwardly-tapering extremity provided with an aperture in its lower end and adapted to permit the entrance of liquid color into said receptacle, a rod vertically movable through said receptacle and adapted to have a reciprocatory movement, whereby its end may be projected vertically beyond said aperture, and a spring applied for insuring the projection of the extremity of said rod outwardly beyond said aperture, substantially as described.

5. In a machine for marbleizing paper, the combination, with a vat for holding a color-supporting liquid, of an apparatus for distributing color on the surface of the liquid in said vat and carrying appliances for conveying the paper to and presenting it upon the color on the liquid in said vat, for the purpose set forth.

6. In a machine for marbleizing paper, the combination, with a vat for holding a color-supporting liquid, of an apparatus for distributing color on the surface of the liquid in said vat, carrying appliances for conveying the paper to and presenting it upon the color on the liquid in the vat, and devices for withdrawing the paper off from said liquid, for the purpose set forth.

7. In a machine for marbleizing paper, the combination, with a stationary vat for holding a color-supporting liquid, of a carriage adapted to support a sheet of paper thereon and movable over and away from over said vat, paper-gripping devices on the forward edge of said vat, and means for causing same to open to receive the edge portion of the paper from the carriage, whereby said paper will be held against movement as said carriage retraces, for the purpose set forth.

8. In a machine for marbleizing paper, the combination, with a stationary vat for holding a color-supporting liquid, having paper-gripping devices on the forward edge thereof, of a frame provided with the suitably-supported carrier-cords adapted to be moved horizontally over and nearly to the rear end of said vat, a device for raising the rear portion of the paper on said liquid and overturning such portion and placing it on the rear of said cord-carrier, means for driving said carrier-cords as its supporting-frame travels forward, and means for opening said gripping devices for the release of the paper, substantially as described.

9. In a machine for marbleizing paper, the combination, with a paper-supply roll and a carriage in advance thereof, of another carriage in advance of said first carriage, a paper-severing mechanism located intermediately of said carriages, paper-gripping devices on each of said carriages, means for securing the closing of said gripping devices on the first carriage, means for securing the movement of said first carriage over the next carriage for releasing its gripping devices, for closing the gripping devices on the next carriage, and for retracing said first carriage, and means for securing the operation of the paper-severing mechanism, for the purpose set forth.

10. In a machine for marbleizing paper, the combination, with a paper-supply roll and a carriage in advance thereof, of a vat for holding a color-supporting liquid, paper-conveying appliances between said first carriage and said vat, a paper-severing mechanism located between said first carriage and the secondary carrying appliances, mechanism for securing the movement of said first carriage to present the paper carried thereby to said secondary paper-carrying appliances, means for actuating said paper-severing mechanism, and a mechanism for securing the travel of said secondary carrying appliances to deliver the paper thereon upon the vat and for returning said appliances, for the purpose set forth.

11. In a machine for marbleizing paper, the combination, with a paper-supply roll having a clutch-pulley thereon adapted to rotate freely on the journal of the roll in one direction, but to clutch same in the reverse direction, of a carriage 1 in advance of said roll and a feed-screw with which said carriage has an engagement, substantially as described, means for securing forward and backward rotations of said screw-shaft, a shaft geared to said screw-shaft, having thereon a pulley and a belt around said pulley, and said clutch-pulley, substantially as and for the purpose set forth.

12. The combination, with a paper-supply roll, a carriage 1 in advance thereof, and another carriage in advance of said carriage 1, of vertical guiding ways and a knife vertically movable in said ways and having projections thereon inclined at their upper portions, the inclines 27 on said carriage 1, adapted to raise said knife as the carriage moves forward, a swinging lever having the knife-supporting arm 29, and a stud located on said carriage 1, whereby as said carriage 1 moves rearwardly it will abut against and swing said lever, substantially as and for the purpose described.

13. In a machine for marbleizing paper, in combination, a carriage 1 and another carriage in advance thereof, a feed-screw shaft for each of said carriages and with which they engage, having thereon sets of loose and fixed pulleys, reversely-speeded belts around said pulleys, belt-shifters for each of said belts, having abutment-dogs thereon, and the belt-shifter for the forwardly-driving belt for the second screw-shaft being connected with a swinging lever which is in proximity to said carriage 1, an abutment-stud 68 on said carriage 1, adapted to swing said lever, another abutment on said carriage 1, as its screw-engaging nut, to operate on certain of the belt-shifter dogs to reverse the travel of carriage 1, and an abutment on said second carriage 2 for moving certain of the belt-shifters to reverse the travel of said carriage, substantially as described.

14. In a machine for marbleizing paper, the combination, with a vat for holding a color-supporting liquid, a frame E in advance thereof, means for projecting the same over and away from over said vat, and a sub-frame F, moving in conjunction with said frame E, of a carriage at the opposite side of said vat, a feed-screw shaft with which said carriage engages, having loose and fixed pulleys thereon, reversely-speeded belts around said pulleys, belt-shifters for each of said belts, having abutment-dogs thereon, a pivoted lever 17, extended by one end into proximity to a dog on the shifter for the forwardly-driving belt of said carriage, and a rod connected to said lever, which by its other end has an engagement, substantially as described, with a part of said sub-frame, all whereby as the frame E moves forwardly to convey a sheet of paper from the vat the said carriage will be started forwardly toward the vat, substantially as described.

15. In a machine for marbleizing paper, the combination, with a vat for holding a color-supporting liquid, of a frame E, provided with paper-carrying appliances located near one end of said vat, a carriage 3, located near the other end of said vat, means for projecting said carriage over and away from over said vat, and means for then also projecting said carrier-frame E over and away from over said vat, substantially as described.

16. In a machine for marbleizing paper, the combination, with a vat for holding a color-supporting liquid, of a frame E, provided with paper-carrying appliances located near one end of said vat, a carriage 3, located near the other end of said vat, having the sub-frame L to move therewith, feed-screw shafts for said frame E and carriage with which they engage, having thereon sets of loose and fixed pulleys, reversely-speeded belts around said pulleys, belt-shifters for each of said belts, having abutment-dogs, a pivoted pawl-ended and spring-constrained lever 100, extended into proximity to the dog on the belt-shifter for the rearwardly-driving belt for said frame, and a rod 103, projected rearwardly beyond the end of said sub-frame L, provided on its end with a lug 104, with which said sub-frame may abut, all substantially as and for the purpose set forth.

17. In a machine for marbleizing paper, the combination, with the vat, of the frame E and means for imparting rearward and forward motions thereto, the rollers 121 121, supported and journaled on said frame, the forward of said rollers having a pinion 122 thereon, endless carrier cords or tapes on said rollers, and the stationary rack-bar of a length corresponding to but a portion of the run of said frame, and with which said pinion engages in the rearward portion of its to-and-fro travel, substantially as and for the purpose set forth.

18. In a machine for marbleizing paper, the combination, with the vat, of the frame E and means for imparting rearward and forward motions thereto, the rollers 121 121, supported and journaled on said frame, endless carrier cords or tapes on said rollers, means, substantially as described, for driving the rollers for said endless cords during portions of the forward and backward travel of said frame E, and the set of endless carrier cords or tapes H, intersecting the plane of the carrier-cords on said rollers 121, substantially as and for the purpose set forth.

19. In a machine for marbleizing paper, the combination, with the vat for holding a color-supporting liquid, of a jaw 83, overlying the forward edge of the vat, an upright support for said jaw, and movable inclines 94, for raising the supports for the upper jaw, substantially as described.

20. In a machine for marbleizing paper, the combination, with the vat for holding a color-supporting liquid, of a jaw 83, overlying the forward edge of the vat, an upright support for said jaw, provided with the trap-doors 97 and 99, the sub-frame L, provided with an incline 94, the sub-frame F, provided with an incline 98, and means for imparting to said frames forward and rearward movements, substantially as described.

21. In a machine for marbleizing paper, the combination, with the vat for holding a color-supporting liquid, of a lower jaw 84, resting on the forward edge of said vat, an upper jaw 83, resting on said lower jaw, an upright support for each of said jaws, the one for the lower jaw provided with recesses 90 and 92 and the one for the upper jaw provided with the trap-doors 97 and 99, the sub-frame L, provided with the inclines 94 and 95, the sub-frame provided with the inclines 98, and means for imparting to said sub-frames forward and rearward movements, substantially as and for the purpose set forth.

22. In a machine for marbleizing paper, the combination, with the vat, of a jaw overlying the forward edge of the vat, formed in sections, each carried by uprights, a horizontal transverse supporting-board for all of said sectional jaw-carrying uprights vertically movable, and means, substantially as described, for raising and lowering said board, substantially as and for the purpose described.

23. In a machine for marbleizing paper, the combination, with a carriage provided near its end with uprights having vertical ways therein and apertures therethrough, spindles movable in said ways, carrying a gripper-bar and each having a slot 78 therethrough, wedges passing through said spindle-slots and said apertures to secure when forced in one direction the movement of said spindles, and springs to force said spindles in the other direction when said wedges are reversely moved, for the purpose set forth.

24. In a machine for marbleizing paper, the combination, with the vat and the cord-carrier, and means for projecting same rearwardly over the vat and withdrawing the said frame from over the vat, of the journal-studs having the extensions carrying the transverse rod and means for partially rotating said journal-studs, for the purpose set forth.

25. In a machine for marbleizing paper, the combination, with the vat, of the journal-studs having the extensions 108 and intermediately thereof the cross-rod 109, a sheave on one of the journal-studs, a chain or cord passed over said sheave, having a weight on one end, a transverse bar 114, to which the other terminal portion of said chain is guided and connected, the sliding latch-rod 115, having the lug 116 thereon, and the movable sub-frame F, having the incline 120 and the dogs 118 and 119, substantially as and for the purpose set forth.

26. The combination, with the vat and the ways at the sides thereof, comprising the inclined end slots 122 and 123 and the upper and lower longitudinal ways 124 and 125, and the switching-fingers 128, located over the inclined slots 123, of the movable frame E, and the arms pivoted thereto and provided with a brush having projections bearing in said ways, substantially as and for the purpose described.

27. The combination, with the vat and the ways at the sides thereof, comprising the inclined end slots 122 and 123 and the upper and lower longitudinal ways 124 and 125, and the switching-fingers located over the inclined slots 122, of a movable carriage and arms pivoted thereto and provided with a comb or rake having projections bearing in said ways, substantially as and for the purpose set forth.

28. In a machine for marbleizing paper, the combination, with a vat for containing a color-supporting liquid, of an apparatus for distributing color on said liquid, a combing device carried on a suitable support, and means for moving said support, for the purpose set forth.

29. In a machine for marbleizing paper, the combination, with a vat for holding a color-supporting liquid, of gripping devices at the forward end thereof, means for opening said gripping devices and causing them to close, a carriage and means for moving same over said vat to present the extremity of the paper thereon within said gripping devices and for retracing said carriage, and a brush movable over and upon the surface of the paper then resting on the said liquid, substantially as and for the purpose described.

30. In a machine for marbleizing paper, the combination, with the vat, of a paper-conveying carriage 3, means for imparting to said carriage forward and backward movements, gripping devices on the forward end of said carriage, comprising the uprights having vertical ways therein and apertures therethrough, spindles movable in said ways, carrying a gripper-bar, each having a slot therethrough, wedges passing through said spindle-slots and said apertures to secure, when forced in one direction, the movement of said spindles, springs to force said spindles in the other direction when said wedges are reversely moved, and fixed studs to secure the movement of said wedges as the carriage reaches its forward limit, substantially as and for the purpose described.

31. The combination, with the vat and a support for the color-boxes, provided with the rack-bar 49, of a carriage, as the one 2, and a screw-shaft with which it is engaged, means for rotating said shaft both forward and rearwardly, a gear 57 on said screw-shaft, and a shaft 53, having thereon a gear meshing with said screw-shaft gear and also provided with a pinion engaging with said rack-bar 49, substantially as and for the purpose set forth.

32. In a machine for marbleizing paper, a stationary vat for containing a color-supporting liquid, a support above said vat, a series of color-holding receptacles carried by said vat, and a nozzle extending down from each color-holding receptacle, all combined substantially as described.

33. In a machine for marbleizing paper, a stationary vat for containing a color-supporting liquid, a color-holding receptacle above said vat, a nozzle projecting down from said receptacle, and a movable finger passing through said nozzle, all combined substantially as described.

CHAS. H. BELLAMY.

Witnesses:
WM. S. BELLOWS,
G. M. CHAMBERLAIN.